United States Patent
Ja et al.

(10) Patent No.: US 7,244,926 B2
(45) Date of Patent: Jul. 17, 2007

(54) MICRORESONATOR-BASED HIGH-PERFORMANCE HIGH-PRESSURE SENSOR AND SYSTEM

(75) Inventors: Shiou-jyh Ja, Stillwater, OK (US);
Lloyd Salsman, Stillwater, OK (US);
Brian Strecker, Stillwater, OK (US);
Robert Shelton, Stillwater, OK (US);
Frederick G. Johnson, Lanham, MD (US)

(73) Assignee: Nomadics, Inc., Stillwater, OK (US)

( * ) Notice: Subject to any disclaimer, the term of this patent is extended or adjusted under 35 U.S.C. 154(b) by 21 days.

(21) Appl. No.: 11/068,587

(22) Filed: Feb. 28, 2005

(65) Prior Publication Data

US 2005/0210989 A1    Sep. 29, 2005

Related U.S. Application Data

(60) Provisional application No. 60/548,046, filed on Feb. 26, 2004.

(51) Int. Cl.
*G01J 1/04* (2006.01)
*G01L 9/00* (2006.01)

(52) U.S. Cl. .................... 250/227.14; 73/705

(58) Field of Classification Search ........ 250/227.14–227.24; 385/12, 30; 73/705
See application file for complete search history.

(56) References Cited

U.S. PATENT DOCUMENTS 4,775,214 A * 10/1988 Johnson ............... 385/12
5,284,061 A * 2/1994 Seeley et al. ........... 73/746
6,698,294 B2 * 3/2004 Jacob et al. ............ 73/708

* cited by examiner

Primary Examiner—Thanh X. Luu
(74) Attorney, Agent, or Firm—Dunlap, Codding & Rogers, P.C.

(57) ABSTRACT

An optically-powered integrated microstructure pressure sensing system for sensing pressure within a cavity. the pressure sensing system comprises a pressure sensor having an optical resonant structure subject to the pressure within the cavity and having physical properties changing due to changing pressures within the cavity. A substrate supports the optical resonant structure. An input optical pathway evanescently couples light into the optical resonant structure. An output optical pathway collects light from the optical resonance structure. A light source delivers a known light input into the input optical pathway whereby the known light input is evanescently coupled into the optical resonant structure by the input optical pathway and a portion of such light is collected from the optical resonant structure by the output optical pathway. A light detector receives the portion of the light collected from the optical resonant structure, and generates a light signal indicative of such portion of the light collected from the optical resonant structure. A temperature compensation sensor generates a temperature signal indicative of the temperature near the optical resonant structure. A spectrum detection device receives the light signal and temperature signal. The spectrum detection device analyzing the light signal and the temperature signal with a detection algorithm to generating a pressure signal indicative of the pressure within the cavity.

56 Claims, 6 Drawing Sheets

MICRORESONATOR-BASED HIGH-PERFORMANCE HIGH-PRESSURE SENSOR AND SYSTEM

CROSS-REFERENCE TO RELATED APPLICATIONS

The present patent application claims priority to the provisional patent application identified by U.S. Ser. No. 60/548,046 filed on Feb. 26, 2004, the entire content of which is hereby incorporated herein by reference.

STATEMENT REGARDING FEDERALLY SPONSORED RESEARCH AND DEVELOPMENT

The present invention was supported by National Institute of Science and Technology (NIST) Small Business Innovation Research (SBIR) program, SB1341-04-W-1128.

BACKGROUND OF THE INVENTION

High-pressure transducers play several important roles in a variety of industries. The most demanding application for precision high-pressure transducers may be found in the oil and gas production industry. The oil and gas production capacity of a reservoir is determined from models using the precision measurement of pressure during and after product is vented through a standard orifice. Monitors for reservoir pressure operate in a "downhole" environment with pressures up to 200 MPa (25,000 psig) and temperatures up to 300° C. This measurement is critical to energy production companies since it directly influences the ability to finance operations.

Additional applications for high-pressure transducers include monitoring water jet cutting equipment, plastic extrusion, and hydroforming processes. Operating pressures for water jet cutting machines may exceed 413 MPa (60,000 psig). Current pressure monitors utilize strain gauge-based devices. The accuracy of these gauges rarely exceeds 0.01%. Hydroforming is a machining technique that uses high pressure to force the work material onto a die. Proper operation of the hydroformer requires high dynamic monitoring of extreme pressures.

Quartz pressure transducers, which have earned their reputation in high standard pressure sensing, have been widely used for some of those crucial applications. The high accuracy and stability of the quartz thickness shear mode resonance (TSMR) have been used as the high quality frequency standard sensing technique, along with surface acoustic wave (SAW) devices1. The advantages of quartz pressure sensors are: good pressure range (up to 280 MPa), high resolution (1 ppm [parts per million] or 0.0001%), lower susceptibility to environmental parameters such as temperature (with special cutting), and long-term stability within a protected environment. The resolution and accuracy come from the high resonance quality (Q factor). The quartz Q factor can be as high as 4000, which needs to be carefully preserved in a hermetically sealed, evacuated environment.

However, there are several problems with quartz pressure sensing technologies that trigger motivation to seek new methods to address these needs. Quartz pressure transducers appear to be limited for applications by higher pressure due to mechanical "twinning" of the pressure sensitive crystal element. "Twinning" is the reversal of the piezoelectric polarity under stress. For a crystal oscillator, the onset of twinning stops the crystal oscillation. For applications above 280 MPa, new materials and methods must be used.

As new techniques have been introduced in the oil and gas industry, new requirements have pushed quartz pressure transducers to the limits of their capabilities. Horizontal production techniques, which allow the extension of the production zone, mandate the use of smaller pressure transducers. Current transducers are typically larger than one inch in diameter. A target diameter of one-half inch or less is desirable to support horizontal operations; such size reductions are difficult for quartz technology to achieve.

The quartz pressure transducer technology dates from the middle 1960s. Since that time, crystal manufacturing operations have been migrating overseas to minimize labor expenses. Crystal manufacturers that previously provided the special purpose elements used in the quartz sensors as an adjunct to the more volume-oriented frequency control business have been severely and negatively impacted by this migration. The development expense is increased by the reluctance of crystal manufacturers to participate in specialty crystal design given the minimal potential market. The lifetime of quartz pressure transducers was, perhaps, underestimated since many existing tools date from the original production. Given the aging fleet of existing sensors, an opportunity exists to infuse a new and more "manufacturable" technology.

Additionally, the quartz reference and sensors along with the necessary electronics package must operate in harsh environments for long periods of time (e.g., several years) with a minimum of maintenance. The severe environment dictates that extensive efforts must be made to protect the equipment. These measures contribute to the expense of the transducer. Transducer calibration also must be certified for temperature and pressure. The certification process is time consuming and adds to the transducer cost.

In natural quartz, the left and right forms are about evenly distributed, resulting in optically twinned material. The presence of twinning prevents the crystal from being used as a resonator. On the other hand, cultured quartz is mostly right forms of quartz, so that twinning is not a problem. However, under very high pressure, several deformation mechanisms, such as mechanical twinning and creeping, may occur in the crystal lattice structure. These pressure-induced defects cause the failure of those quartz-based pressure sensors. This fact sets the upper limit of quartz pressure sensing to about 140–280 MPa.

Finally, yet importantly, it is almost impossible for the quartz transducer to perform direct sensing without the translation of a force collector such as a bellows or Bourdon tube because quartz has no tolerance to the surface contamination. The introduction of a force collector not only injects hysteresis and noise but also complicates the design.

High quality factor mode (HQM) micro-resonator technology is a unique optical resonance phenomenon with extremely high resonance quality factor (Q factor can be ~1E10 or $10^{10}$), which inherently enables itself in the ultra-high resolution spectroscopy. HQM micro-resonators are mostly made of fused silica or glass material, which does not suffer lattice defects under significant pressure. The pressure sensitivity is similar to or better than quartz while it can maintain elasticity up to 9 GPa.

These micro-resonators can be realized in the form of micro-spheres, micro-cylinders, or even a micro-ring/disk structures embedded in an optical chip. Their diameters typically are as small as 5 μM or up to a millimeter, but most are around 100 μm or less.

The following list summarizes some of the technical merits of HQM microresonator-based pressure sensing technology:

Ultra-high resolution technology
  Capability to sustain pressure above 500 MPa
  Microscopic sensing element
  Completely passive device
  Optical interrogation Researchers have realized since the days of Lord Rayleigh that dielectric materials can be used as waveguides and optical resonators. One of the famous HQM resonance is the so-called whispering-gallery mode (WGM) resonance of spherical dielectric particles, which was studied in detail nearly sixty years ago. A microsphere is essentially a fused quartz ball (typically on the order of 100 µm more or less in diameter). Since the sphere is generally more optically dense than its surrounding medium, light in the sphere can be internally reflected. Light propagating inside the sphere would then be spatially constrained to travel along the perimeter of a great circle of the sphere (the perimeter of a plane that intersects the sphere with maximum area). The light propagates inside the sphere until it is absorbed or scattered by material imperfections. Light constrained in this way is said to be trapped in a whispering-gallery mode. WGM resonators have been proposed for several applications, such as add/drop filters in optical communication, optical switches, laser cavities, and high-resolution spectrometers.

Excitation and interrogation of the HQM's can be accomplished by evanescent-wave coupling. Input and output coupling can be achieved by overlapping the HQM's evanescent field with that of a prism or eroded/angle-polished/tapered single-mode optical fiber by way of example, but not limitation. FIG. 2 shows a waveguide coupling light into the microring resonator from its left side.

Braginsky et al. pointed out several years ago that the low losses and small electromagnetic mode volumes of HQM make high-Q microresonators attainable. A resonance quality (O) as high as 8E9 has been observed in the laboratory environment and Q up to 1E9 can be preserved in protected environments (such as hermetically sealed boxes) for a long period. Due to the nature of high-Q resonance, the spectral peaks (or nulls) of the resonance spectrum are very narrow, which essentially provides the capability of very narrow-band optical filtering.

The outstanding resonance quality of HQM's can be directly translated to high measurement resolution and stability. The spectral resolution can be derived by the Q factor and amplitude resolution as follow. The full-width at half-maximum (FWHM) can be expressed as $$\frac{\lambda}{Q}.$$

If the resonance peak is roughly modeled as a triangular shape, then the spectral resolution can be derived as the multiplication of amplitude resolution and FWHM. For example, the FWHM is 1.55 pm (picometer) for a Q=1E7 resonator at 1550 nm. With 1% amplitude resolution, the spectral resolution will be 0.0015 pm. This number is based on the spectral shift measurement without going into interferometer design.

Fiber Bragg grating (FBG) is one widely used sensing technology to optically measure pressure or force-induced strain. However, due to its limited Q factor (~1E4 or lower) it is difficult to provide enough measurement resolution because of its broad spectral feature. Several FBG-based pressure sensing studies have been published. Xu et al. has reported a FBG sensor with 0.22-nm spectral shift under 70-MPa for direct sensing. The pressure sensitivity is about 3 pm/MPa. Other research has used special side-hole FBG and boosted the sensitivity about two times. A FBG-based pressure sensor commercialized by Sabeus has listed resolution of 0.05%, which is consistent with our analysis. With limited pressure sensitivity and spectral resolution, the FBG is less appealing in the high-resolution pressure sensing.

Though FBG technology may not be suitable to for high-resolution pressure sensors, many research and development efforts in temperature compensation and signal interrogation can be translated into HQM resonator technology because of their common nature in spectral domain interrogation and temperature compensation.

Currently, quartz transducers typically employ specialized quartz sensors. A typical quartz pressure transducer would include a reference oscillator, using a temperature- and stress-compensated crystal, a quartz temperature sensor, and a quartz pressure sensor. The quartz temperature sensor provides a temperature measurement independent of pressure so that the pressure measurement may be compensated for temperature variations. The quartz pressure sensor is designed for a specific response to stress applied in a plane determined by a quartz force collector. The pressure sensor is exposed to external pressure while the electronics package, temperature, and reference elements are isolated.

The HQM resonances will not only respond to the strain but also to the temperature. Xu et al. first reported a discrimination technique by using superimposed dual FBGs at 850 and 1300 nm. Afterward, many approaches were reported by using dual FBG with different fiber materials, diameters, and grating types. These methods are all based on the differentiation of strain and temperature effect upon spectral shift. The spectral shift of the two FBG wavelengths ($\Delta\lambda_{1,2}$) can be modeled as follow:

$$\begin{bmatrix} \Delta\lambda_1 \\ \Delta\lambda_2 \end{bmatrix} = \begin{bmatrix} K_{\varepsilon 1} & K_{T1} \\ K_{\varepsilon 2} & K_{T2} \end{bmatrix} \begin{bmatrix} \Delta\varepsilon \\ \Delta T \end{bmatrix},$$

where $K_{\varepsilon 1,2}$ are the strain-response coefficients, $K_{T1,2}$ are the thermo-response coefficients, $\Delta\varepsilon$ is the applied strain due to pressure, and $\Delta T$ is the temperature change. The contribution due to pressure-induced stress is introduced through Young's modulus, Poisson ratio, and photoelastic constant, while the contribution from temperature is determined by thermal expansion and thermo-optic coefficients. Therefore, the coefficient ratio $$\frac{K_{\varepsilon 1}}{K_{\varepsilon 2}}$$

should be different from $$\frac{K_{T1}}{K_{T2}}.$$

This discrepancy provides information to solve $\Delta\varepsilon$ and $\Delta T$, respectively.

Thus, a need exists for an improved pressure sensing system which has a pressure sensor which can be made smaller in size and capable of accurately measuring higher pressures than the quartz pressure transducers discussed above. It is to such an improved pressure sensing system that the present invention is directed.

DETAILED DESCRIPTION OF THE INVENTION

Figure 1:
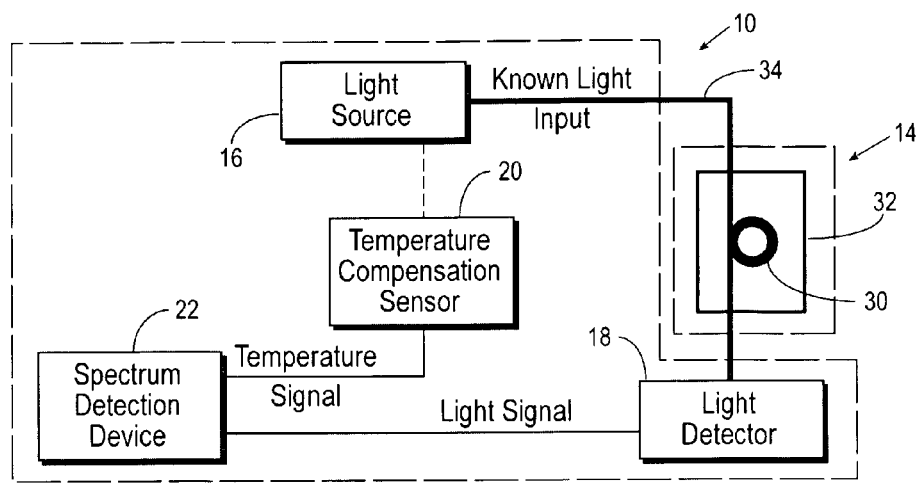
FIG. 1 is a schematic view of an optically-powered integrated microstructure pressure sensing system, constructed in accordance with the present invention, for sensing pressure.
Figure 7:
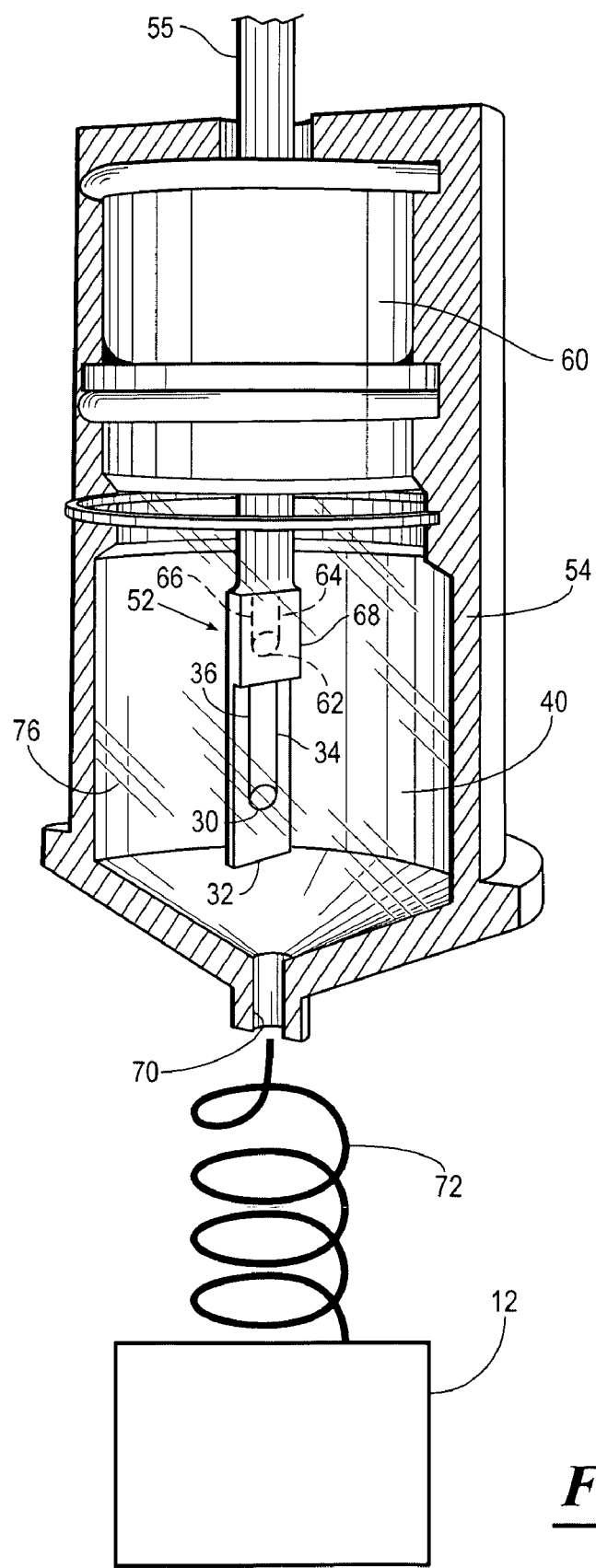
FIG. 7 is a partial schematic, partial cross-sectional view of a pressure sensor connected to a vessel by way of a spiral tubing for detecting the pressure within the vessel.

Referring now to the drawings, and in particular to FIGS. 1 and 7, shown therein and designated by a reference numeral 10 is an optically-powered integrated microstructure pressure sensing system for sensing pressure within a vessel 12 (shown in FIG. 7), such as a flow-line or tank. The optically-powered integrated microstructure pressure sensing system 10 will be referred to hereinafter as the "pressure sensing system". An example of the vessel 12 is depicted in FIG. 7. In general, the pressure sensing system 10 is provided with one or more pressure sensor 14, one or more light source 16, one or more light detector 18, one or more temperature compensation sensor 20, and one or more spectrum detection device 22.

The pressure sensor 14 is provided with one or more optical resonant structure 30, one or more substrate 32, one or more input optical pathway 34, and one or more output optical pathway 36. The optical resonant structure 30 is subject to the pressure within the vessel 12 and has physical properties changing due to changing pressures within the vessel 12. The substrate 32 supports the optical resonant structure 30. The input optical pathway 34 is positioned to evanescently couple light transmitted through the input optical pathway 34 into the optical resonant structure 30. The output optical pathway 36 is positioned to collect light from the optical resonant structure 30.

The light source 16 delivers a known light input into the input optical pathway 34 whereby the known light input is evanescently coupled into the optical resonant structure 30 by the input optical pathway 34. A portion of the light evanescently coupled into the optical resonant structure 30 is collected from the optical resonant structure 30 by the output optical pathway 36. The light detector 18 receives the portion of the light collected from the optical resonant structure 30 by the output optical pathway 36. The light detector 18 generates a light signal indicative of such portion of the light collected from the optical resonant structure 30. The temperature compensation sensor 20 generates a temperature signal indicative of the temperature near the optical resonant structure 30 so that temperature compensation of the pressure detected by the pressure sensor 14 can be effected. The spectrum detection device 22 receives the light signal and the temperature signal. The spectrum detection device 22 analyzes the light signal and the temperature signal with a detection algorithm to generate a pressure signal indicative of the pressure within the vessel 12.

Figure 2:
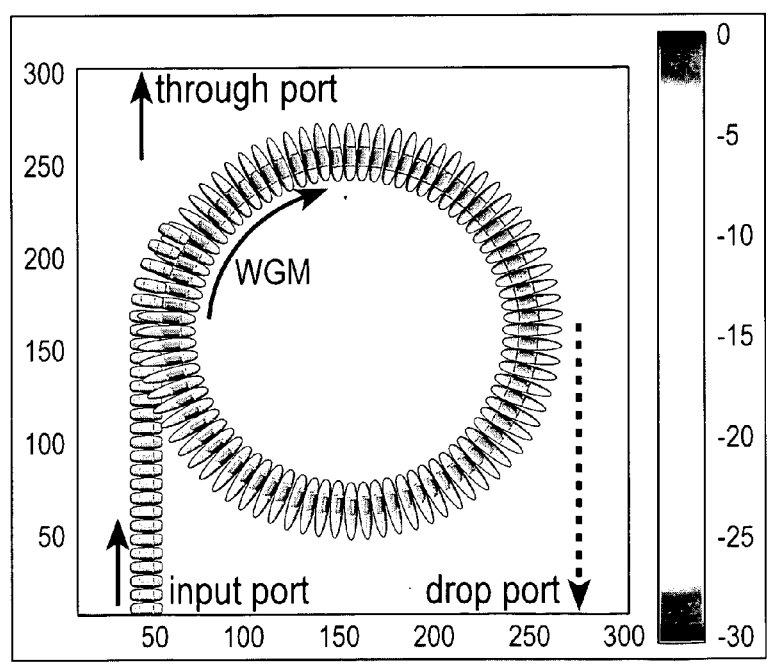
FIG. 2 is a diagram illustrating a waveguide-coupled high quality factor mode of a resonant light propagating within a microring optical resonant structure.
Figure 3:
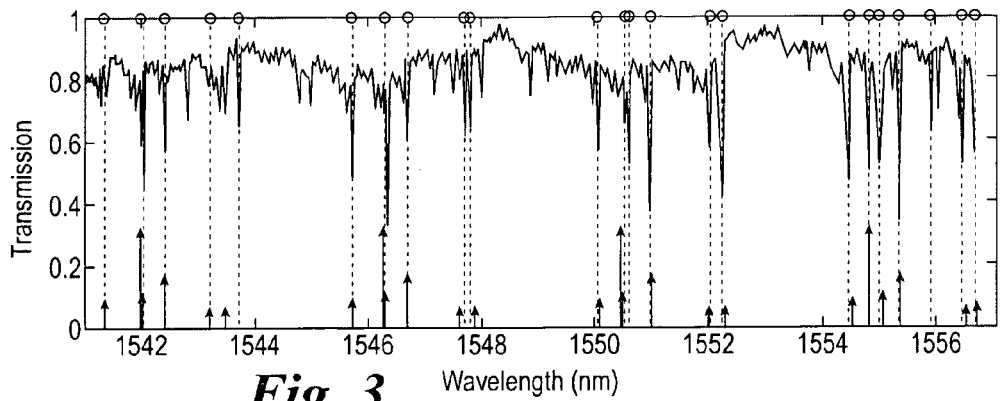
FIG. 3 is a chart illustrating a null spectrum of a whispering gallery mode detected at a through port.

When the known light input in the input optical pathway 34 goes through the optical resonant structure 30 as shown in FIG. 2, some energy at the resonance wavelength gets trapped inside the optical resonant structure 30. In one preferred embodiment, the input optical pathway 34 and the output optical pathway 36 are formed by a single waveguide, such as a strand of optical fiber, extending past the optical resonant structure 30. In this instance, the output optical pathway 36 can be referred to as a "through port." The spectrum at the "through port" has a so-called "null spectrum." FIG. 3 shows the null spectrum of a 125-μm WGM micro-cylinder. At the bottom, the arrows indicate the mode order: the longest arrows stand for the lowest order mode, while the second longest arrows for the $2^{nd}$ order (radial) mode. As the arrows get shorter, the mode number is higher. The spectral spacing between two adjacent lowest order modes is the free spectral range (FSR). A similar spectral feature will be repeated every FSR. The HQM spectrum will shift under strain, but the amount of shift may be different for each order of resonance.

Figure 4:
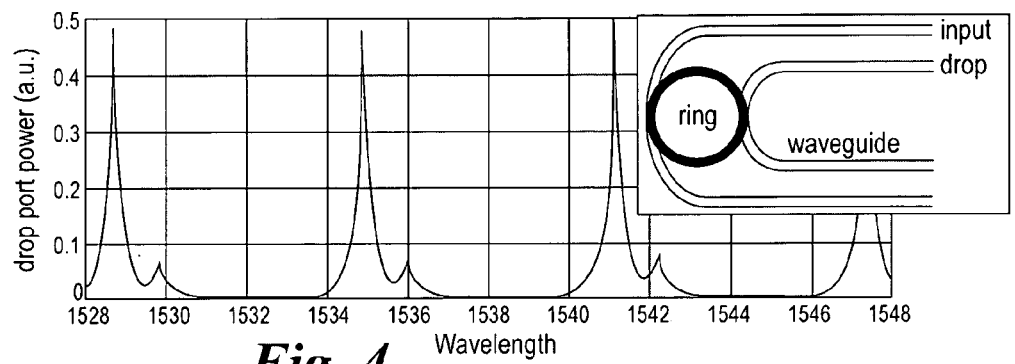
FIG. 4 is a chart illustrating the high quality factor mode spectrum detected at a drop port of a micro-ring resonator, the layout of the micro-ring resonator and the waveguide forming the drop port is shown in the inset.

In another preferred embodiment, the input optical pathway 34 and the output optical pathway 36 are formed of separate waveguides. In this instance, the output optical pathway 36 can be referred to as a "drop port." The HQM spectrum at the drop port will be a "peak spectrum" instead of the "null spectrum" as shown in FIG. 4. The input optical pathway 34 and/or the output optical pathway 36 can be formed by planar waveguide(s) approaching the side or top of the optical resonant structure 30, which would have a nearly permanent relationship with the optical resonant structure 30.

The optical resonant structure 30 is a completely passive device. The only requirement for the operation of the optical resonant structure 30 is a waveguide connection, such as the input and output optical pathways 34 and 36 which provide optical interrogation signals to perform the sensing. The known light signal is substantially immune to the electromagnetic interference (EMI) from the sensing environment. Furthermore, the spectral domain data acquisition enables wave division multiplexing (WDM) to be implemented. Thus, the spectrum detection device 22 can include a centralized readout system away from the harsh sensing environment and can support multiple pressure sensors 14 for distributed sensing. This feature can reduce the average cost of individual pressure sensors 14, as well as the cost of operation and management dramatically.

The optical resonant structure 30 can be a WGM resonator. Whispering Gallery mode (WGM) resonance describes the phenomenon which electromagnetic (EM) energy, such as light, can be trapped inside a cavity with a smooth circular boundary and propagating around the perimeter through successive total internal reflection from the cavity boundary. The refractive index of the cavity needs to be greater than that of its ambient material so that the total internal reflection is supported and WGM resonance is possible. The propagation of the EM energy of the WGM mode is confined by a single interface formed by the cavity and its ambient material. The EM field intensity outside of cavity decays exponentially along the radial direction. This type of field is termed "evanescent field". On the other side, the EM field inside the cavity is not confined by any physical boundary. Therefore, many different field distributions can be supported by this structure. All of the field distributions have only a single evanescent wave tail extending outside of the cavity/ambient material interface.

The WGM resonance may be found in several forms of structures: sphere, cylinder, and disk. Their structures are in solid volume and require at least one plane with perfect circular perimeters to support WGM resonance. The circular perimeter is essential criteria for the production of WGM resonance.

The common means of coupling EM energy into and out of the WGM resonance is through the evanescent field coupling. When the evanescent field of the coupler overlaps with the evanescent field of the WGM resonance, the EM energy can be transferred between the coupler and the WGM resonator.

Because the cavity material usually has very low optical loss and both the total internal reflection and evanescent field coupling are low loss processes, the WGM resonator can preserve the trapped EM energy very efficiently. When the WGM resonator has very low loss, the resonance quality factor becomes high and the resonance spectrum has very narrow bandwidth, which is suitable for high resolution sensing applications.

The optical resonant structure 30 can also be a closed-loop waveguide resonator. Optical waveguides were designed to confine the EM energy and guide the energy propagating toward a desired direction. They usually have two or more interfaces formed by the waveguide material and their ambient material, which support multiple evanescent fields. Because of their low optical loss material and capability to confine the energy inside the waveguide, optical waveguide, which is not a resonantor initially, can preserve EM energy very efficiently as long as the energy is propagating inside the waveguide. By connecting the two ends of an optical waveguide, an optical resonator is formed by this close-loop waveguide. The energy preserving capability of the optical waveguide does not depend on the route of the waveguide at all. An optical waveguide can be arranged in a linear route, an irregular route, or a circular loop without changing its waveguiding property significantly. This is different from a WGM resonator which requires a circular boundary to form the WGM.

An optical waveguide can be connected with its two ends to form a complete loop, which is actually a resonant structure. This closed-loop waveguide (CLW) resonator provides an infinite long path to trap the EM energy propagating inside the loop with great efficiency. This loop may have any shape without changing its capability to preserve the EM energy.

By combining the excellent energy preserving property of the close-loop waveguide with the commonly used evanescent field coupling technique, the close-loop waveguide can be used as an innovative structure to support high quality factor mode (HQM) resonance. Both WGM resonators and CLW resonators can support HQM resonance, but they are based on complete different physical phenomena.

Since the CLW resonators have multiple material interfaces, there are multiple evanescent wave tails extended out of all interfaces. With this large amount of evanescent field, the sensitivity of the sensing applications that rely on the evanescent fields can be greatly improved.

Even though the shape of the loop is not essential for the CLW resonators, the circular loop has the lowest bending loss as the size of the loop reduces to the micron range. Micro-ring is one example of the CLW resonators at micrometer size. When the size of the closed-loop waveguide resonator shrinks down, the circular shape of the closed-loop waveguide has minimum loss. However, circular closed-loop waveguide resonators are still not WGM resonators.

Figure 5:
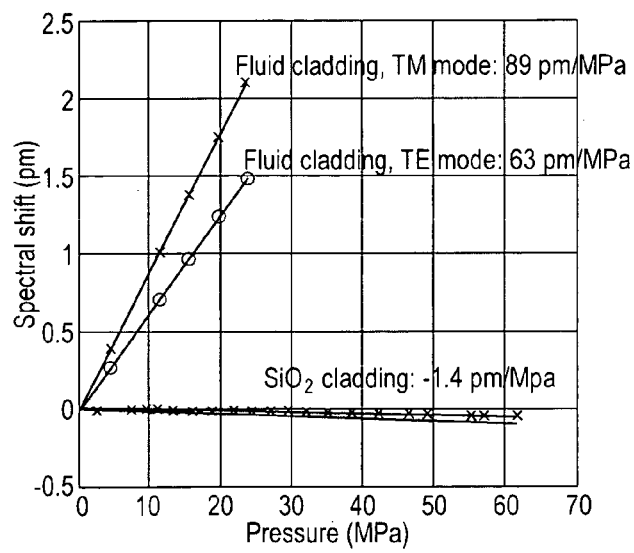
FIG. 5 is a chart illustrating a high quality factor mode of spectral shift versus a weight load applied to the optical resonant structure.

The HQM resonance is a parametric resonance phenomenon, which is dependent on the material, property and geometry of the optical resonant structure 30, as well as the ambient environment surrounding the optical resonant structure 30. The pressure applied on the optical resonant structure 30 produces elastic geometric changes and refractive index changes, which in turn cause a WGM spectral shift as shown in FIG. 5.

Besides their advantage in spectral resolution, HQM-based sensors also have important material advantages. The optical resonant structure 30 is preferably fabricated of glass material, also sometimes referred to as amorphous silica or fused quartz. Defects in the lattice structure do not present in this material. The HQM resonance is an optical parametric resonance, which typically does not suffer catastrophic failure due to the material property change.

The behavior of amorphous silica under extremely high pressure (e.g., several GPa) has been studied. Experiments show that the bulk modulus will decrease with increasing pressure to a minimum at −3 GPa. However, this effect remains reversible until 9 GPa has been reached. Therefore, the glass material should be a good candidate for pressure sensing in a range from about 280 to about 500 MPa.

Figure 6:
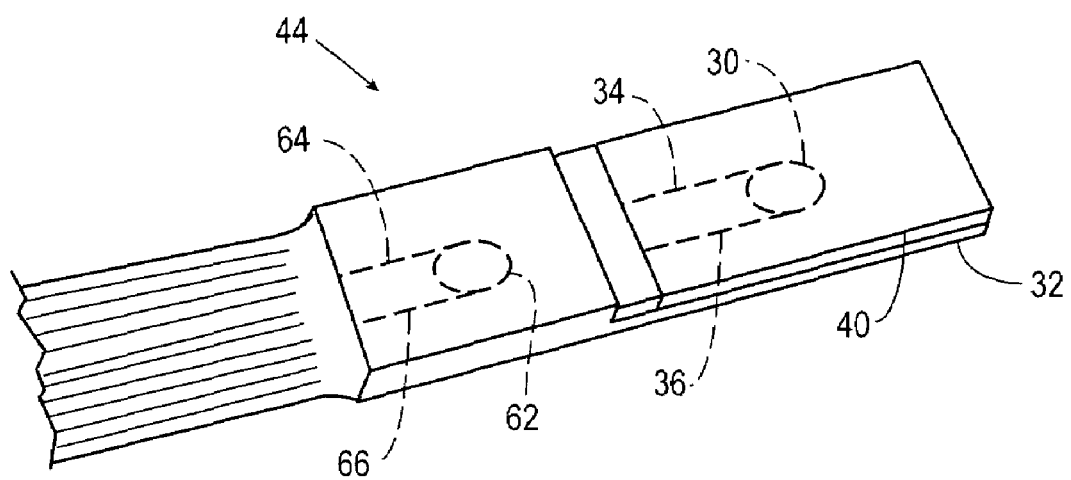
FIG. 6 is a perspective view of a pressure sensor constructed in accordance with the present invention configured as an optical chip having a micro-ring resonator forming the optical resonant structure.

The optical resonant structure 30 can be constructed of a microsphere, or other type of resonant structure, such as a micro-cylinder, a micro-disk, and a micro-ring resonators. Microspheres and micro-cylinders often are fabricated as discrete components. The fabrication process usually generates very smooth surfaces due to the surface tension and high heat, which makes a Q factor ranging from 1E6–1E8 possible. However, surface cleanness and coupling alignment need to be carefully maintained to preserve the HQM resonance. Fortunately, micro-disks and micro-ring resonators are often realized as a planar optical structure. Light can be coupled in and out via planar waveguides (input optical pathway 34 and/or output optical pathway 36) approaching the side or top of the optical resonant structure 30, which has a nearly permanent relationship with the optical resonant structure 30. As will be described in more detail below, in one preferred embodiment the optical resonant structure 30 can be sandwiched by the substrate 32 and a cladding 40 (FIG. 6) to form an optical chip 44 for use in forming the pressure sensor 14, which provides excellent protection to the structures and resonance field. The substrate 32 can be constructed of any rigid material that is optically transparent at the operating wavelength, such as silica, glass material or optical quality polymer material. In this way, the high-Q HQM resonance can be stabilized for a long time. The problem of a planar optical resonant structure 30 is the limited Q factor (<5E5) due to its rough surface through fabrication by lithography or etching. The cladding 40 can be constructed of any type of material capable of transmitting pressure to the optical resonant structure 30. As shown in FIG. 7, the cladding 40 can be constructed of a fluid surrounding at least a portion of the optical resonant structure 30. To form the optical chip 44, the cladding 40 can also be constructed of a solid coating, and in this instance, the cladding 40 is desirably constructed of an elastic optically transparent material, such as plastic, latex rubber, or polymer material. The same substrate material can be used as cladding material. The glass material can be used as harder cladding and the polymer-based material as softer cladding.

Referring again to FIG. 1, the light source 16 can be any type of light source (either broadband or narrow band) which produces a known or predetermined light signal. For example, the light source 16 can be constructed with a scanning tunable diode laser (TDL). A suitable TDL has been found to be a model TDL 6328 obtainable from New Focus, Inc. of San Jose, Calif. The New Focus TDL 6328 has a spectral range of 1519–1576 nm with short-term bandwidth of 300 kHz and long-term bandwidth of 5 MHz. The smallest spectral step size is about 0.3 pm.

The light detector 18 can be a photodiode, CVD, phototransistor or any other device capable of detecting the light in the output optical pathway 36 so that the optical spectrum in the output optical pathway 36 can be sampled or recorded. For example, the light detector 18 can be an IR detector. For the narrow-band light sources such as a laser, the light detector 18 can be a photodiode to acquire the spectrum. For the broad-band light sources such as light emitting diode, amplified spontaneous emission (ASE), or any white light sources, the light detector 18 can be an optical spectrometer with appropriate spectral resolution to acquire the spectrum.

The light source 16 can be calibrated with a multi-wavelength meter. A suitable multi-wavelength meter is an HP 86120B multi-wavelength meter with 1-pm resolution obtainable from Hewlett-Packard Co. of Palo Alto, Calif. The light detector 18 can also include an optical power meter for measuring throughput intensity. A suitable optical power meter, e.g., a model 1825-C, can be obtained from Newport Corp. of Irvine, Calif. By scanning the wavelength of the light source 16 and recording the power reading by the light detector 18, the HQM spectrum can be acquired. The light detector 18 can include a high-resolution optical spectrum analyzer to speed up the spectrum acquisition process. In one preferred embodiment, the input optical pathway 34 and the output optical pathway 36 include high quality angle-polished single-mode fibers to remove undesired light intensity fluctuation due to the etalon effect. The currently demonstrated 3-pm resolution is limited by the in-house wavelength measurement instrument used in the calibration process.

The temperature compensation sensor 20 can be any type of temperature sensor, such as a thermistor, a thermocouple, a resistance temperature detector, a semiconductor thermometer device, or a thermal imaging device. One preferred embodiment of an optically powered temperature compensation sensor 20 will be described in more detail below.

The spectrum detection device 22 includes a computer or computer system for receiving the light signal and the temperature signal. The computer or computer system runs the detection algorithm to generate the pressure signal. The terms "computer system" and "computer" as used herein mean a system or systems which are able to embody and/or execute the logic of the processes described herein. The logic embodied in the form of software instructions or firmware may be executed on any appropriate hardware which can be a dedicated computer system or systems, a personal computer system, a main frame computer system, a mini-computer system, a server, or a distributed processing computer system. All of these computer systems are well understood in the art. Thus, a detailed description of how to make or use such computer systems is not deemed necessary herein. In one preferred embodiment, the spectrum detection device 22 also includes software to automate the operation of the light source 16, light detector 18 and temperature compensation sensor 20 to obtain the data necessary to form the pressure signal. For example, the data acquisition process can be automated by a personal computer running a Labview program(s).

FIG. 7 illustrates one embodiment of the pressure sensor 14 for measuring the pressure within the vessel 12. The pressure sensor 14 includes a pressure-sensing chip 52 or the optical chip 44 within a pressure vessel 54. The pressure sensing chip 52 includes the substrate 32, the optical resonant structure 30, the input optical pathway 34 and the output optical pathway 36. The input optical pathway 34 and the output optical pathway 36 are connected to optical fibers 55 sealed with a high pressure feed-through 60. The temperature compensation sensor 20 comprises an optical resonant structure 62, an input optical pathway 64, and an output optical pathway 66. The optical resonant structure 62 is mounted on the substrate 32 (or another substrate) and covered with a rigid cladding 68 so as to have different pressure response from the structure 30 within the pressure vessel 54. The input optical pathway 64 is positioned to evanescently couple light transmitted through the input optical pathway 64 into the optical resonant structure 62 of the temperature compensation sensor 20. The output optical pathway 66 is positioned to collect light from the optical resonance structure 62 of the temperature compensation sensor 20. The pressure sensing system 10 preferably includes an optical splitter (not shown) for directing the known light signal generated by the light source 16 to the input optical pathways 34 and 64 of the pressure sensor 14 and the temperature compensation sensor 20. The optical resonant structure 62, the input optical pathway 64 and the output optical pathway 66 can be constructed in similar manners as the optical resonant structure 30, input optical pathway 34 and the output optical pathway 36.

The pressure vessel 54 of the pressure sensor 14 defines a port 70. A spiral tubing 72 is provided for connecting the port 70 of the pressure sensor's pressure vessel 54 with a cavity within the vessel 12. The pressure vessel 54 and the spiral tubing 72 are filled with a fluid 76 such that the pressure-sensing chip 52 is immersed within the fluid 76. The fluid 76 forms the cladding 40, and also serves to transmit pressure within the vessel 12 to the optical resonant structure 30 of the pressure-sensing chip 52 while also isolating the pressure sensing chip 52 from the contents of the vessel 12.

The detection algorithm desirably uses a discrimination technique for detecting the pressure within the vessel 12 using the light signal and the temperature signal. This method is based on the differentiation of strain and temperature effect upon spectral shift. The spectral shift of the wavelengths ($\Delta\lambda_{1,2}$) from the optical resonant structure 30 of the pressure sensor 14 and the optical resonant structure 62 of the temperature compensation sensor 20 can be modeled as follows:

$$\begin{bmatrix} \Delta\lambda_1 \\ \Delta\lambda_2 \end{bmatrix} = \begin{bmatrix} K_{\varepsilon 1} & K_{T1} \\ K_{\varepsilon 2} & K_{T2} \end{bmatrix} \begin{bmatrix} \Delta\varepsilon \\ \Delta T \end{bmatrix}, \qquad \text{Eq. (1)}$$

where $K_{\kappa 1,2}$ are the strain-response coefficients, $K_{T1,2}$ are the thermo-response coefficients, $\Delta\varepsilon$ is the applied strain, and $\Delta T$ is the temperature change. The contribution due to stress is introduced through Young's modulus, Poisson ratio, and photoelastic constant, while the contribution from temperature is determined by thermal expansion and thermo-optic coefficients. Therefore, the coefficient ratio $$\frac{K_{\varepsilon 1}}{K_{\varepsilon 2}}$$

should be different from $$\frac{K_{T1}}{K_{T2}}.$$

This discrepancy provides information to solve $\Delta\varepsilon$ and $\Delta T$, respectively. One extreme example is to expose the temperature compensation sensor 20 only to temperature change but not to pressure change while structure 30 is receiving both pressure and same temperature change. This method essentially nullifies the pressure-response coefficient (i.e., $K_{\varepsilon 11}=0$), while maintaining $K_{\varepsilon 2}$ and $K_{T2}$. Then, the Eq. (1) can be used to derive both pressure and temperature changes. Additionally, various cladding material can be used to form cladding 40, which will render different temperature and pressure response from structure 30 for the temperature and pressure response discrimination. Finally, micro-spheres and micro-disks inherently have strong high order resonance spectra, which have different responses to pressure and temperature. This unique characteristic allows HQM sensors to implement Brady's method naturally.

Although the pressure sensor 14 has been shown and described utilizing the spiral tubing 72 and the fluid 76 to indirectly transmit pressure to the optical resonant structure 30, the pressure sensor 14 can be modified to perform direct sensing by constructing the substrate 32 of an optically transparent material, such as a glass material, and replacing the fluid 76 forming the cladding 40 with a solid material forming the cladding 40. For example, the cladding 40 can be constructed of a glass material or softer polymer material, and the entire pressure sensing chip 52 can be directly installed in the pressurized environment to perform direct sensing. This can provide significant technical merit compared to indirect sensing technologies such as quartz. Not only can the mechanical hysteresis be substantially eliminated, but also substantially all the mechanical noise and design complexity of the force collector can be avoided. The net effect is better accuracy, repeatability, and stability.

The optical resonant structure 30, such as HQM microring resonators, are commercially available from Little Optics of Annapolis Junction, Maryland and such micro-ring resonators are fabricated from a glass material sold under the trademark "Hydex", which has a refractive index of about 1.7 and can achieve a refractive index contrast up to about 25%. Hydex material and silica share similar mechanical properties such as the capability of sustaining high pressure, temperature, and compatibility to the existing lithography fabrication process. The layout of a micro-ring resonator is shown in the inset of FIG. 4. The ring configuration removes all the higher order resonance so that there is only one resonance peak in each FSR. The double peaks are due to the two perpendicular polarizations. Although this is an off-the-shelf device with a Q factor of only about 5,000 (which is only suitable for its original design goal), it still demonstrates pressure sensing applications. The intrinsic Q is 5E6, which sets the upper limit for the attainable Q after signal coupling.

As discussed above, the substrate 32 can be constructed of silica. The optical resonant structure 30 can be protected by the substrate 32 and the cladding 40. As mentioned before, the material used as the substrate 32 can also be used as the cladding 40. Therefore, force can be directly applied onto the substrate 32 and cladding 40 without damaging the optical resonant structure 30. The input and output optical pathways 34 and 36 can be pigtailed to standard telecom single-mode fiber, which is handy for optical interrogation.

FIG. 5 shows the experimental data of the pressure induced HQM spectral shifts for two different cladding materials. As shown in FIG. 5, the wavelength red shifting effect (positive spectral shifting upon pressure) of microring with the fluid cladding is much faster than the blue shift (negative spectral shifting upon pressure) produced by the microring with $SiO_2$ cladding. The pressure sensitivities for various configurations and resonance modes are noted in the figure. It has been confirmed that the "fluid cladding", where the fluid is the cladding 40, is more compressible than $SiO_2$ and the strain-optical effect of the fluid surpasses the size-changing effect of the optical resonant structure 30 itself. The net effect is a much larger red shifting of the spectrum upon pressurization. The pressure sensitivities up to +118 pm/MPa (811 fm/psi) using the silicon oil and +89 pm/MPa (613 fm/psi) using the Spinesstic 22 have been observed, which is almost two orders of the magnitude over the sensitivity of the optical resonant structure 30 with $SiO_2$ cladding. Pressure sensing resolution can be measured by using the calibrated instrument such as the Ruska dead weight tester.

The pressure sensitivity and the resolution was tested by the following procedures:
1. The dead weight tester was parked at a calibrated static pressure.
2. A small weight was positioned on top of the tester piston to introduce a known calibrated pressure jump at a known time. Then, the weight may be taken off the piston to produce a pressure drop at another time.
3. A portion of the resonance spectrum was recorded continuously during the pressure jump/drop introduction events.
4. The acquired spectral data were processed to extract pressure-related spectral shift and determine system noise level. The pressure sensitivity can be found from the spectral shift and the resolution can be derived from the sensitivity and the standard deviation (std) of the noise through the following equation:

$$\text{resolution} = \frac{std(\text{noise}) \times 2}{\text{pressure induced shift}} \times \text{pressure jump/drop}, \qquad (2)$$

which uses the twice the amount of the standard deviation of the signal during the static pressure period as the measure to define the sensing resolution. Preliminary experiment results have demonstrated that pressure resolution of 2 ppm over the full scale is possible.

Figure 8:
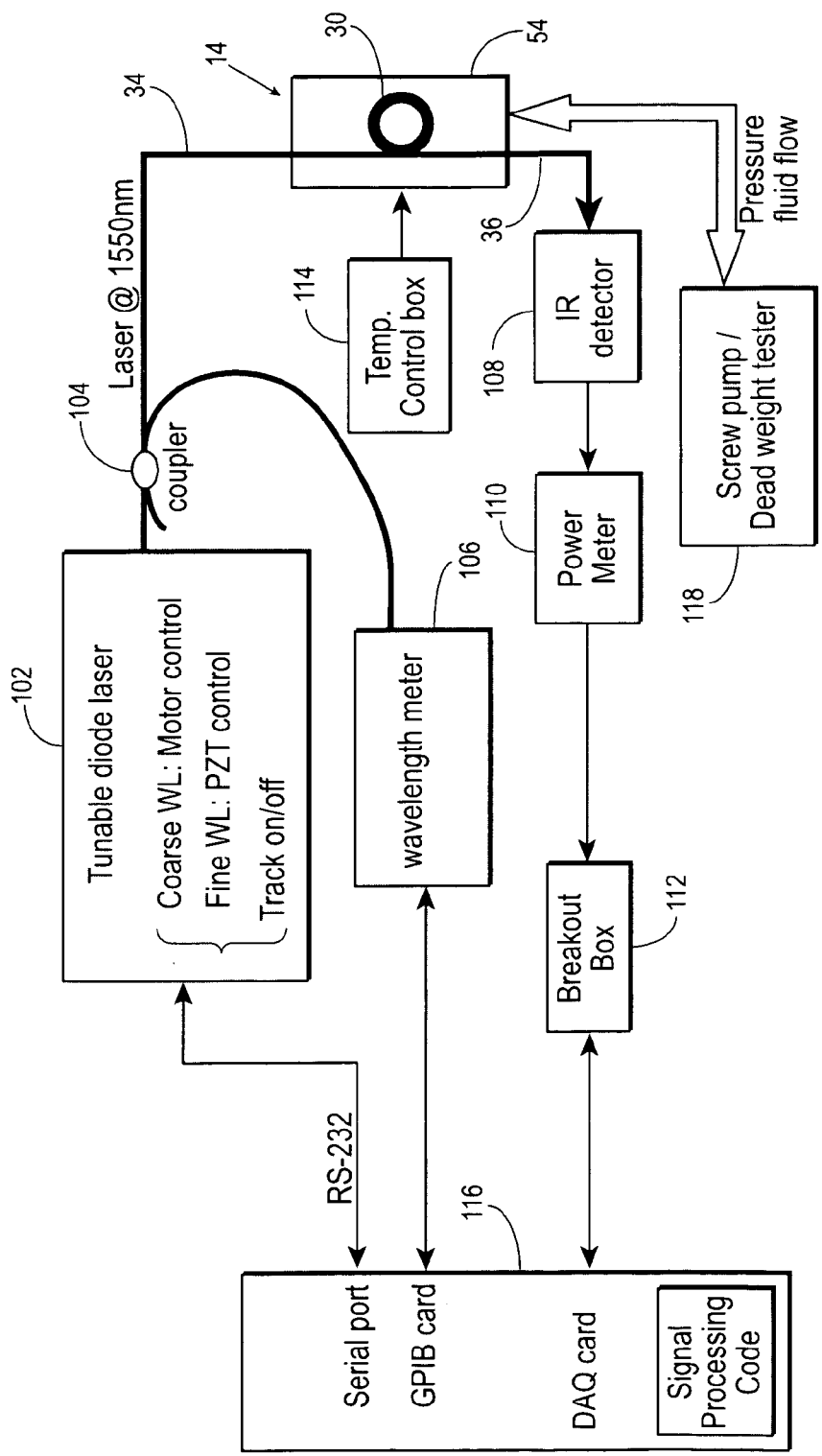
FIG. 8 is a schematic view of a data acquisition set up for testing and/or calibrating the pressure sensing system.

Shown in FIG. 8 is a version of a calibration system 100 constructed in accordance with the present invention for calibrating the pressure sensor 14. The calibration system 100 is provided with a light source 102 (shown as a near infrared (NR) tunable diode laser), a coupler 104, a wavelength meter 106, a light detector 108 (shown as an IR detector), a power meter 110, a breakout box 1112, a temperature control box 114, a computer 116, and a pressurizer 118 (shown as a screw pump/dead weight tester). The construction of the light source 102 and the light detector 108 is similar to the construction of the light source 16 and the light detector 18 discussed above.

The pressure vessel 54 can be be filled with pressure fluid such as Dow 200 silicone oil, Spinesstic 22, or Dioctyl Sebacate (DOS) for transmitting the pressure to the optical resonant structure 30 of the pressure sensor 14. The pressurizer 118 pressurizes the pressure vessel 54 up to a predetermined pressure of 40 MPa, for example. The Temperature control box 114 is used for maintaining the temperature of the pressure fluid at a constant predetermined temperature.

In use, the pressurizer 118 pressurizes the vessel 54 to a variety of predetermined stepped pressures while the light source 102 feeds the known light signal to the pressure sensor 114 via the input optical pathway 34. The pressure within the vessel 54 can be determined by way of a pressure gauge, preferably having a pressure resolution of 0.01%. The light signals generated by the optical resonant structure 30 are received by the light detector 108 and are fed to the computer 116 via the power meter 110 and the breakout box 112. The breakout box 112 provides the external connectivity for the data acquisition hardware to receive signals from various sources. The computer 116 records the light signals and utilizes the light signals to calibrate the pressure sensor 14 based on the known temperature and known pressures.

The light source 102 can be a New Focus TDL 6328 having a spectral range of 1519–1576 nm with short-term bandwidth of 300 kHz and long-term bandwidth of 5 MHz. The smallest spectral step size is about 0.3 pm. The wavelength meter 106 can be a model HP 86120B multi-wavelength meter with 1-pm resolution which is used to provide wavelength calibration. The light detector 108 can be a Newport optical power meter 1825-C to measure throughput intensity. By scanning the TDL wavelength and recording the power reading, the HQM spectrum can be acquired. A high-resolution optical spectrum analyzer may be used at later stages to speed up the spectrum acquisition process. High quality angle-polished single-mode fibers will be used for connection to remove undesired light intensity fluctuation due to the etalon effect. The data acquisition process will be automated by a PC computer through Labview programs.

As discussed above, HQM-based sensors made of glass material have advantages over quartz, such as less susceptibility to mechanical defects and the capability of maintaining elasticity at pressures above several GPa. However, the manner in which the optical resonator is constructed is of critical importance. This material system may not be capable of sustaining the high pressures that are required in this application and it is important to determine the range over which this material combination is stable, so that a more robust resonator configuration can be identified in case of material failure.

In one embodiment, the optical resonant structure 30 can be constructed of a high refractive index chemical vapor deposition (CVD) glass that is deposited on the surface of a silicon wafer (substrate) for telecommunications applications. Differences in Young's modulus between the optical resonant structure 30 and the substrate may induce cracking or delamination. Since the failures that would prove most detrimental to the pressure sensor are those that will impact its optical properties, optical microscopy will serve well to characterize damage of interest. Structural testing of pressure sensors 14 may be accomplished by placing pressure sensors in pressure fluid and then taking the pressure fluid to pressure. After cleaning, the pressure sensors will be stained with a fluorophore and imaged on a confocal microscope. The transparency of the optical resonant structure 30, the refractive index discontinuity at any crack, and the 0.1 μm vertical step resolution of the available microscope will permit a 3D image of internal defects. The pressure sensors 30 will then be stained for scanning electron microscopy by a preferential etch that will highlight any surface cracks, coated, and imaged.

Figure 9:
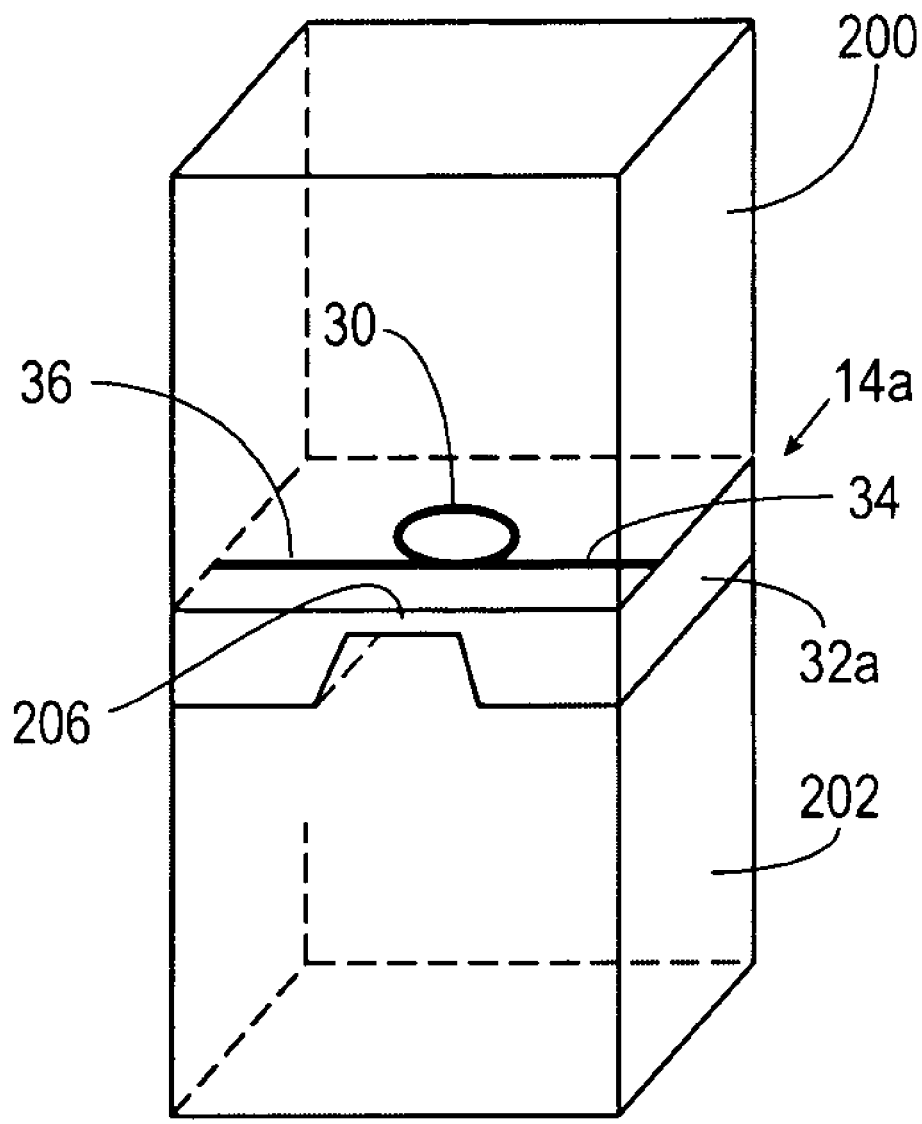
FIG. 9 is a perspective view of a pressure sensor, constructed in accordance with the present invention, for sensing a differential pressure between two vessels.

Shown in FIG. 9 is an alternate embodiment of a pressure sensor 14a constructed in accordance with the present invention for use by the pressure sensing system 10 for determining a differential pressure between two vessels 200 and 202. The vessels 200 and 202 are pressure vessels holding two pressures where the differential pressure is to be measured.

The pressure sensor 14a is provided with a substrate 32a supporting the optical resonant structure 30. The known light signal is evanescently coupled into the optical resonant structure 30 via the input optical pathway 34. Light is evanescently coupled out of the optical resonant structure 30 via the output optical pathway 36. Although not shown in FIG. 9, the pressure sensor 14a can optionally be provided with a cladding 40a, similar to the cladding 40 for protecting the optical resonant structure 30 or improving pressure sensitivity with the cladding 40 formed of material of higher strain-optical effect.

The substrate 32a is provided with a flexible membrane 206 upon which the optical resonant structure 30 is disposed. The membrane 206 is deformed by pressure differentials between the vessels 200 and 202, which cause deformation of the optical resonant structure 30 and its optional cladding 40a. The deformation of the optical resonant structure 30 and its optional cladding 40a cause a spectral shift which is then used to calculate the pressure differential. If the pressure within one of the pressure vessels 200 and 202 is known, the pressure sensor 14a can be used as an absolute pressure sensor.

The following references are expressly and specifically incorporated in their entirety to the extent necessary to enable the invention.

References Cited

1. E. EerNisse, The Japan Journal of Applied Physics, 40, 3479 (2001).
2. D. Salt, Handbook of Quartz Crystal Devices, Van Nostrand Reinhold, 1987.
3. M. L. Gorodetsky, A. A. Savchenkov, and V. S. Ilichenko, Opt. Lett., 21, 453 (1995).
4. M. Grirnsditch, Phy. Rev. Lett., 52, 2379 (1984).
5. T. A. Birks, J. C. Knight, and T. E. Dimmick, EEE Photon. Tech. Lett., 12, 182 (2000).
6. S. Suzuki, K. Shuto, and Y. Hibino, EEE Photon. Tech. Lett., 4, 1256 (1992). B. E. Little, J. S. Foresi, G.

Steinmeyer, E. R. Thoen, S. T. Chu, H. A. Haus, E. P. Ippen, L. C. Kimerling, and W. Greene, EEE Photon. Tech. Lett., 10, 549 (1998).
7. Lord Rayleigh, Phil. Mag. 43, 125 (1897).
8. R. D. Richtmyer, J. Appl. Phys. 10, 391 (1939).
9. V. B. Braginsky, M. L. Gorodetsky, V. S. Ilchenko, Phys. Lett. A 137, 393 (1989).
10. J. C. Knight, N. Dubreuil, V. Sandoghdar, J. Hare, V. Lefevre-Seguin, J. M. Raimond, and S. Haroche, Opt. Lett. 20, 1515 (1995) and Opt. Lett. 21, 698 (1996). A. Serpengüzel, S. Arnold, and G. Griffel, Opt. Lett. 20, 654 (1995).
11. M. G. Xu, L, Reekie, Y. T. chow, and J. P. Dakin, Electro. Lett., 29, 398 (1993).
12. M. G. Xu, J.-L. Archambault, L. Reekie, and J. P. Dakin, Electro. Lett., 30, 1085 (1994).
13. B.-O. Guan, H.-Y. Tam, S.-L. Ho, W.-H. Chung, and X.-Y. Dong, Electro. Lett., 36, 1018, (2000).
14. S. W. James, M. L. Dockney, and R. P. Tatam, Electro. Lett., 32, 1133 (1996).
15. X. Shu, Y. Liu, D. Zhao, B. Gwandu, F. Floreani, L. Zhang, and I. Bennion, Opt. Lett., 27, 701 (2002).
16. M. G. Xu, L. Dong, L. Reekie, J. A. Tucknott, and J. L. Cruz, Electronics Letters, 31, 823 (1995).
17. H. J. Patrick, G. M. Williams, A. D. Kersey, J. R. Pedrazzani, A. M. Vengsarkar, EEE Photon. Tech. Lett., 8, 1223 (1996).
18. G. P. Brady, K. Kalli, D. J. Webb, D. A. Jackson, L. Reekie, J. L. Archambault, IEE Proc. Optoelectron., 144, 156 (1997).

The invention has been described by way of preferred embodiments. Various changes and modifications will be apparent to one skilled in the art to which it pertains. These modifications are intended to be within the spirit and scope of the invention defined by the following claims.

What is claimed is:

1. An optically-powered integrated microstructure pressure sensing system for sensing pressure within a cavity, the pressure sensing system comprising:
   a pressure sensor, comprising:
      an optical resonant structure subject to the pressure within the cavity and having physical properties changing due to changing pressures within the cavity;
      a substrate supporting the optical resonant structure;
      an input optical pathway positioned to evanescently couple light transmitted through the input optical pathway into the optical resonant structure;
      an output optical pathway positioned to collect light from the optical resonant structure; and
   an elastic cladding material partially surrounding the optical resonant structure, the elastic cladding material positioned to transmit the pressure within the cavity to the optical resonant structure a refractive index of the elastic cladding material has an opposite temperature dependency to that of the optical resonant structure to reduce the temperature dependency of the optical resonant structure
   a light source delivering a known light input into the input optical pathway whereby the known light input is evanescently coupled into the optical resonant structure by the input optical pathway and a portion of such light is collected from the optical resonant structure by the output optical pathway;
   a light detector receiving the portion of the light collected from the optical resonant structure by the output optical pathway, and generating a light signal indicative of such portion of the light collected from the optical resonant structure;
   a temperature compensation sensor generating a temperature signal indicative of the temperature near the optical resonant structure; and
   a spectrum detection device receiving the light signal and temperature signal, the spectrum detection device analyzing the light signal and the temperature signal with a detection algorithm for generating a pressure signal indicative of the pressure within the cavity.

2. The pressure sensing system of claim 1, wherein the optical resonant structure has a Q-factor in a range greater than 1,000.

3. The pressure sensing system of claim 1, wherein the optical resonant structure is formed by a close-looped waveguiding structure.

4. The pressure sensing system of claim 3, wherein the close-looped wave-guiding structure is defined by a ring structure.

5. The pressure sensing system of claim 1, wherein the elastic cladding material is formed of an optically transparent material.

6. The pressure sensing system of claim 1, wherein the elastic cladding material has a higher strain-optical effect than that of the optical resonant structure to increase the pressure sensitivity of the optical resonant structure.

7. The pressure sensing system of claim 6, wherein the optical resonant structure has a higher refractive index than the elastic cladding material.

8. The pressure sensing system of claim 1, wherein the elastic cladding material comprises a coating covering the optical resonant structure and bonded to the substrate.

9. The pressure sensing system of claim 8, wherein the coating is formed of a polymeric material.

10. The pressure sensing system of claim 1, wherein the elastic cladding material comprises a fluid positioned in contact with an exterior surface of the optical resonant structure.

11. The pressure sensing system of claim 1, wherein a cross section dimension of the optical resonant structure is comparable to a wavelength of the known light signal, and wherein the known light input propagating inside the optical resonant structure establishes the optical resonance.

12. The pressure sensing system of claim 1, wherein the optical resonant structure is micro-machined.

13. The pressure sensing system of claim 1, wherein the light propagating inside the optical resonant structure and wherein spectral information of the light propagating inside the optical resonant structure is used by the spectrum detection algorithm to generate the pressure signal.

14. The pressure sensing system of claim 1, wherein the portion of the light collected from the optical resonant structure is indicative of interference between the light propagating inside the optical resonant structure and the known light signal in the input optical pathway.

15. The pressure sensing system of claim 1, wherein the light source comprises a tunable narrow-band light source, and wherein the wavelength of the known light signal at the input optical pathway is dithered across an interrogation wavelength range, the light intensity of the light traveling through the output optical pathway is recorded and then the spectrum is acquired.

16. The pressure sensing system of claim 1, wherein the input optical pathway includes a waveguiding structure.

17. The pressure sensing system of claim 1, wherein the input optical pathway includes a free-space light beam.

18. The pressure sensing system of claim 1, wherein the output optical pathway includes a waveguiding structure.

19. The pressure sensing system of claim 1, wherein the output optical pathway includes a free-space light beam.

20. The pressure sensing system of claim 1, wherein the substrate is defined as a deformable membrane which deforms subject to the pressure in the cavity, and wherein the optical resonant structure is mounted onto the substrate such that the deformations of the membrane are communicated to the optical resonant structure whereby the optical resonant structure is subject to the pressure within the cavity.

21. The pressure sensing system of claim 20, wherein the membrane separates two vessels.

22. The pressure sensing system of claim 21, wherein the pressure within one of the vessels is known by the spectrum detection device.

23. The pressure sensing system of claim 1, wherein the temperature compensation sensor comprises:
- an optical resonant structure mounted so as to not be subject to the pressure within the cavity;
- an input optical pathway positioned to evanescently couple light transmitted through the input optical pathway into the optical resonant structure of the temperature compensation sensor; and
- an output optical pathway positioned to collect light from the optical resonant structure of the temperature compensation sensor.

24. The pressure sensing system of claim 23, wherein the optical resonant structure of the temperature compensation sensor is mounted to a substrate which is different than the substrate of the pressure sensor.

25. The pressure sensing system of claim 24, wherein the optical resonant structure of the temperature compensation sensor is encompassed by a rigid cladding.

26. The pressure sensing system of claim 22, wherein the optical resonant structure of the temperature compensation sensor is mounted to the substrate of the pressure sensor.

27. The pressure sensing system of claim 26, wherein the optical resonant structure of the temperature compensation sensor is encompassed by a rigid cladding.

28. The pressure sensing system of claim 1, wherein the output optical pathway is a drop port.

29. An optically-powered integrated microstructure pressure sensing system for sensing pressure within a cavity, the pressure sensing system comprising:
- a pressure sensor, comprising:
  - an optical resonant structure subject to the pressure within the cavity and having physical properties changing due to changing pressures within the cavity;
  - a substrate supporting the optical resonant structure;
  - an input optical pathway positioned to evanescently couple light transmitted through the input optical pathway into the optical resonant structure;
  - an output optical pathway positioned to collect light from the optical resonant structure; and
  - an elastic cladding material partially surrounding the optical resonant structure, the elastic cladding material positioned to transmit the pressure within the cavity to the optical resonant structure, the elastic cladding having a higher strain-optical effect than that of the optical resonant structure to increase the pressure sensitivity of the optical resonant structure;
- a light source delivering a known light input into the input optical pathway whereby the known light input is evanescently coupled into the optical resonant structure by the input optical pathway and a portion of such light is collected from the optical resonant structure by the output optical pathway;
- a light detector receiving the portion of the light collected from the optical resonant structure by the output optical pathway, and generating a light signal indicative of such portion of the light collected from the optical resonant structure;
- a temperature compensation sensor generating a temperature signal indicative of the temperature near the optical resonant structure; and
- a spectrum detection device receiving the light signal and temperature signal, the spectrum detection device analyzing the light signal and the temperature signal with a detection algorithm for generating a pressure signal indicative of the pressure within the cavity.

30. The pressure sensing system of claim 29, wherein the optical resonant structure has a higher refractive index than the elastic cladding material.

31. The pressure sensing system of claim 29, wherein the optical resonant structure has a Q-factor in a range greater than 1,000.

32. The pressure sensing system of claim 29, wherein the optical resonant structure is formed by a close-looped waveguiding structure.

33. The pressure sensing system of claim 32, wherein the close-looped wave-guiding structure is defined by a ring structure.

34. The pressure sensing system of claim 29, wherein the optical resonant structure is at least partially surrounded by an elastic cladding material positioned to transmit the pressure within the cavity to the optical resonant structure.

35. The pressure sensing system of claim 29, wherein the elastic cladding material is formed of an optically transparent material.

36. The pressure sensing system of claim 29, wherein the elastic cladding material comprises a coating covering the optical resonant structure and bonded to the substrate.

37. The pressure sensing system of claim 36, wherein the coating is formed of a polymeric material.

38. The pressure sensing system of claim 29, wherein the elastic cladding material comprises a fluid positioned in contact with an exterior surface of the optical resonant structure.

39. The pressure sensing system of claim 29, wherein a cross section dimension of the optical resonant structure is comparable to a wavelength of the known light signal, and wherein the known light input propagating inside the optical resonant structure establishes the optical resonance.

40. The pressure sensing system of claim 29, wherein the optical resonant structure is micro-machined.

41. The pressure sensing system of claim 29, wherein the light propagating inside the optical resonant structure and wherein spectral information of the light propagating inside the optical resonant structure is used by the spectrum detection algorithm to generate the pressure signal.

42. The pressure sensing system of claim 29, wherein the portion of the light collected from the optical resonant structure is indicative of interference between the light propagating inside the optical resonant structure and the known light signal in the input optical pathway.

43. The pressure sensing system of claim 29, wherein the light source comprises a tunable, narrow-band light source, and wherein the wavelength of the known light signal at the input optical pathway is dithered across an interrogation wavelength range, the light intensity of the light traveling through the output optical pathway is recorded and then the spectrum is acquired.

44. The pressure sensing system of claim 29, wherein the input optical pathway includes a waveguiding structure.

45. The pressure sensing system of claim 29, wherein the input optical pathway includes a free-space light beam.

46. The pressure sensing system of claim 29, wherein the output optical pathway includes a waveguiding structure.

47. The pressure sensing system of claim 29, wherein the output optical pathway includes a free-space light beam.

48. The pressure sensing system of claim 29, wherein the substrate is defined as a deformable membrane which deforms subject to the pressure in the cavity, and wherein the optical resonant structure is mounted onto the substrate such that the deformations of the membrane are communicated to the optical resonant structure whereby the optical resonant structure is subject to the pressure within the cavity.

49. The pressure sensing system of claim 48, wherein the membrane separates two vessels.

50. The pressure sensing system of claim 49, wherein the pressure within one of the vessels is known by the spectrum detection device.

51. The pressure sensing system of claim 29, wherein the temperature compensation sensor comprises:
an optical resonant structure mounted so as to not be subject to the pressure within the cavity;
an input optical pathway positioned to evanescently couple light transmitted through the input optical pathway into the optical resonant structure of the temperature compensation sensor; and
an output optical pathway positioned to collect light from the optical resonant structure of the temperature compensation sensor.

52. The pressure sensing system of claim 51, wherein the optical resonant structure of the temperature compensation sensor is mounted to a substrate which is different than the substrate of the pressure sensor.

53. The pressure sensing system of claim 52, wherein the optical resonant structure of the temperature compensation sensor is encompassed by a rigid cladding.

54. The pressure sensing system of claim 50, wherein the optical resonant structure of the temperature compensation sensor is mounted to the substrate of the pressure sensor.

55. The pressure sensing system of claim 54, wherein the optical resonant structure of the temperature compensation sensor is encompassed by a rigid cladding.

56. The pressure sensing system of claim 29, wherein the output optical pathway is a drop port.

* * * * *

UNITED STATES PATENT AND TRADEMARK OFFICE
CERTIFICATE OF CORRECTION

PATENT NO. : 7,244,926 B2  Page 1 of 2
APPLICATION NO. : 11/068587
DATED : July 17, 2007
INVENTOR(S) : Shiou-jyh Ja et al.

It is certified that error appears in the above-identified patent and that said Letters Patent is hereby corrected as shown below:

In the Drawings:
Sheet 5 of 6, FIG. 8: Insert Reference number -- 100 -- and insert the line to drawing:

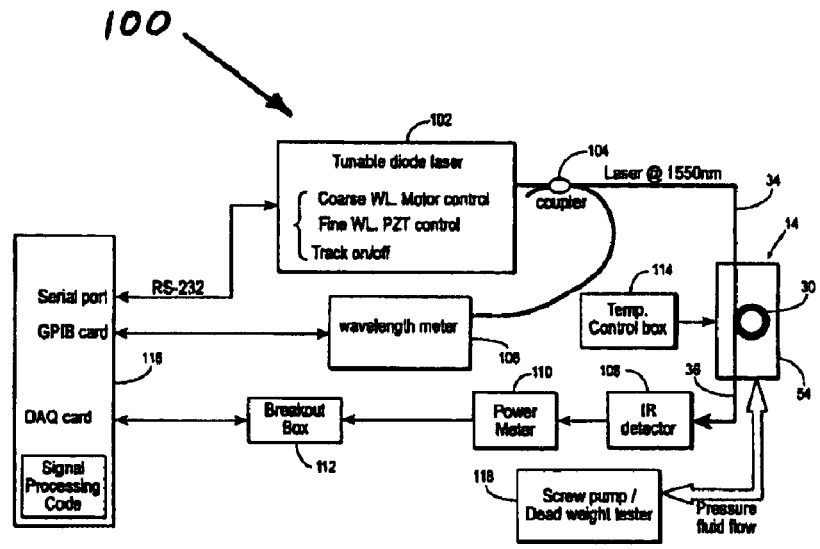

*Fig. 8*

Column 2, line 66: Delete "5 µM" and replace with -- 5 µm --.

Column 3, line 39: Delete "(O)" and replace with -- (Q) --.

Column 3, line 60: Delete "1.55" and replace with -- 0.155 --.

Column 8, line 39: Delete "-3" and replace with -- ~3 --.

Column 9, line 25: Delete "CVD" and replace with -- CCD --.

Column 13, line 7: Delete "(NR)" and replace with -- (NIR) --.

Column 13, line 9: Delete "1112" and replace with -- 112 --.

Column 14, line 63: Delete "Grirnsditch" and replace with -- Grimsditch --.

UNITED STATES PATENT AND TRADEMARK OFFICE
CERTIFICATE OF CORRECTION

PATENT NO. : 7,244,926 B2
APPLICATION NO. : 11/068587
DATED : July 17, 2007
INVENTOR(S) : Shiou-jyh Ja et al.

It is certified that error appears in the above-identified patent and that said Letters Patent is hereby corrected as shown below:

Column 14, line 64: Delete "EEE" and replace with -- IEEE --.

Column 14, line 66: Delete "EEE" and replace with -- IEEE --.

Column 15, line 2: Delete "EEE" and replace with -- IEEE --.

Column 15, line 26: Delete "EEE" and replace with -- IEEE --.

In the Claims:
Column 15, line 55: After "structure" insert a comma -- , --.

Signed and Sealed this

Twenty Second Day of April, 2008

JON W. DUDAS
*Director of the United States Patent and Trademark Office*